(12) United States Patent
Hart et al.

(10) Patent No.: US 7,703,676 B2
(45) Date of Patent: Apr. 27, 2010

(54) ENCRYPTING THE OUTPUT OF A CARD READER IN A CARD AUTHENTICATION SYSTEM

(75) Inventors: Annmarie D. Hart, Carson, CA (US); Terrence R. Benson, Redondo Beach, CA (US); Lawrence R. Meyers, Rancho Palos Verdes, CA (US)

(73) Assignee: MagTek, Inc., Seal Beach, CA (US)

( * ) Notice: Subject to any disclaimer, the term of this patent is extended or adjusted under 35 U.S.C. 154(b) by 5 days.

(21) Appl. No.: 11/949,722

(22) Filed: Dec. 3, 2007

(65) Prior Publication Data

US 2009/0173790 A1 Jul. 9, 2009

Related U.S. Application Data

(60) Provisional application No. 60/868,498, filed on Dec. 4, 2006.

(51) Int. Cl.
G06K 7/08 (2006.01)
(52) U.S. Cl. .................. 235/449; 235/380; 235/493; 705/64
(58) Field of Classification Search .............. 235/449, 235/380, 493; 705/64
See application file for complete search history.

(56) References Cited

U.S. PATENT DOCUMENTS

| | | | |
|---|---|---|---|
| 5,235,166 A | 8/1993 | Fernandez | |
| 5,430,279 A | 7/1995 | Fernandez | |
| 5,491,752 A | 2/1996 | Kaufman et al. | |
| 5,524,072 A | 6/1996 | Labaton et al. | |
| 5,616,904 A | 4/1997 | Fernandez | |
| 5,644,636 A | 7/1997 | Fernandez | |
| 6,760,841 B1 | 7/2004 | Fernandez | |
| 6,830,182 B2 | 12/2004 | Izuyama | |
| 7,210,627 B2 | 5/2007 | Morley, Jr. et al. | |
| 2003/0192948 A1* | 10/2003 | Izuyama | 235/449 |
| 2004/0182921 A1 | 9/2004 | Dickson et al. | |

(Continued)

OTHER PUBLICATIONS

International Search Report for Application No. PCT/US07/086315 filed Dec. 3, 2007, dated May 27, 2008, mailed Jun. 11, 2008, 2 pages.

(Continued)

*Primary Examiner*—Allyson N Trail
(74) *Attorney, Agent, or Firm*—Christie, Parker & Hale, LLP.

(57) ABSTRACT

Systems and methods for encrypting the output of a card reader in a card authentication system are provided. In one embodiment, the invention relates to a method for reading a data card having an intrinsic magnetic characteristic and recorded data on the data card using a read head including a magnetic sensor having a housing, an analog to digital converter located within the housing and a processor located within the housing, the method including generating an analog signal indicative of the intrinsic magnetic characteristic and the recorded data of the data card, converting the analog signal into a digital signal, generating a magnetic fingerprint based on the intrinsic magnetic characteristic from the digital signal, extracting the recorded data from the digital signal, encrypting at least a portion of the recorded data, storing the magnetic fingerprint and the recorded data, and outputting the encrypted at least the portion of the recorded data.

36 Claims, 9 Drawing Sheets

U.S. PATENT DOCUMENTS

| | | | |
|---|---|---|---|
| 2005/0006471 A1* | 1/2005 | Bedell et al. | 235/440 |
| 2005/0165695 A1 | 7/2005 | Berardi et al. | |
| 2005/0167496 A1 | 8/2005 | Morley, Jr. et al. | |
| 2006/0049255 A1 | 3/2006 | von Mueller et al. | |

OTHER PUBLICATIONS

Written Opinion for Application No. PCT/US07/086315 filed Dec. 3, 2007, dated May 27, 2008, mailed Jun. 11, 2008, 5 pages.

International Search Report for Application No. PCT/US07/60586 filed Jan. 16, 2007, dated Sep. 12, 2008, mailed Sep. 19, 2008, 3 pages.

Written Opinion for Application No. PCT/US07/60586 filed Jan. 16, 2007, dated Sep. 12, 2008, mailed Sep. 19, 2008, 3 pages.

* cited by examiner

US 7,703,676 B2

ENCRYPTING THE OUTPUT OF A CARD READER IN A CARD AUTHENTICATION SYSTEM

CROSS REFERENCE TO RELATED APPLICATION

This application claims priority to and the benefit of U.S. Provisional Patent Application No. 60/868,498 filed on Dec. 4, 2006, entitled "System and Method for Encrypting the Output of a Card Reader", the contents of which are expressly incorporated by reference in their entirety.

BACKGROUND

The present invention relates to reading, encrypting and protecting information stored in association with a data card. This stored information can be securely transferred over a data network. Examples of data cards include credit cards, identification cards, or other similar cards.

The security of personal financial and identification information is an important concern for consumers. Such information commonly stored on data cards includes account numbers, expiration dates, the names of card users, identification numbers, or other information. Often phishing and spoofing scams are designed to acquire the personal financial information of everyday consumers from their personal data cards by fraud or by other deceptive means. Many of these schemes rely on the ability to extract information stored on the data cards using conventional magnetic read heads.

SUMMARY OF THE INVENTION

The invention relates to encrypting the output of a card reader in a card authentication system. In one embodiment, the invention relates to a read head configured to read a data card having an intrinsic magnetic characteristic and recorded data on the data card, the read head including a magnetic sensor having a housing, the magnetic sensor configured to generate an analog signal indicative of the intrinsic magnetic characteristic and the recorded data, an analog to digital converter located within the housing and coupled to the magnetic sensor, the analog to digital converter configured to convert the analog signal into a digital signal, and a processor located within the housing and coupled to the analog to digital converter, the processor configured to receive the digital signal, generate a magnetic fingerprint based on the intrinsic magnetic characteristic from the digital signal, extract the recorded data from the digital signal, encrypt at least a portion of the recorded data, store the magnetic fingerprint and the recorded data, and output the encrypted at least the portion of the recorded data.

In another embodiment, the invention relates to a method for reading a data card having an intrinsic magnetic characteristic and recorded data on the data card using a read head including a magnetic sensor having a housing, an analog to digital converter located within the housing and a processor located within the housing, the method including generating an analog signal indicative of the intrinsic magnetic characteristic and the recorded data of the data card, converting the analog signal into a digital signal, generating a magnetic fingerprint based on the intrinsic magnetic characteristic from the digital signal, extracting the recorded data from the digital signal, encrypting at least a portion of the recorded data, storing the magnetic fingerprint and the recorded data, and outputting the encrypted at least the portion of the recorded data.

DETAILED DESCRIPTION OF THE INVENTION

Figure 1:
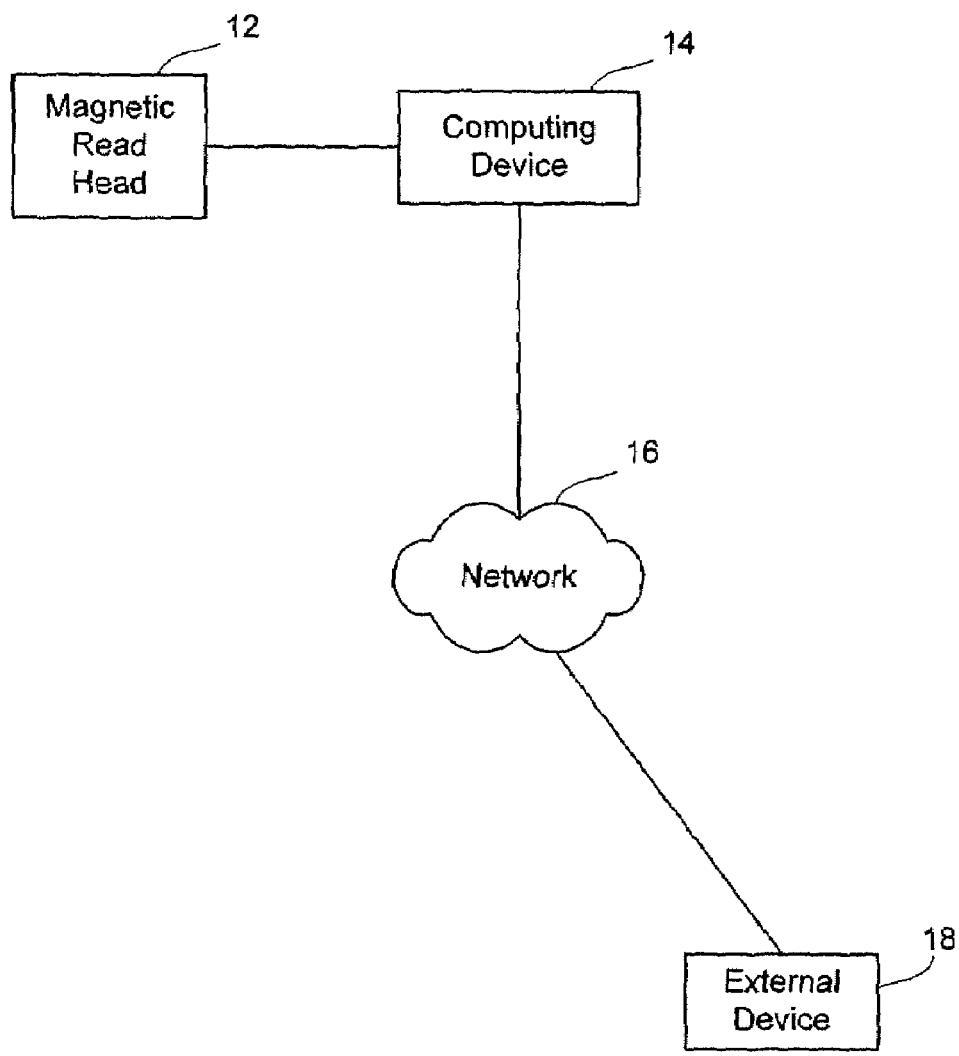
FIG. 1 is a schematic view of a card transaction system including a magnetic read head in accordance with an embodiment of the invention.

Referring now to the drawings, embodiments of magnetic read heads read information stored on data cards, encrypt the data card information, output the encrypted data card information to external devices, authenticate the data cards and resist tampering. In several embodiments, the magnetic read heads use a magnetic sensor to read information stored on data cards having a magnetic stripe (magnetic stripe cards). In other embodiments, methods used in conjunction with the magnetic read heads can be used to read other types of data cards such as contact smart cards, contactless smart cards, and other types of cards including integrated circuits.

Several embodiments of magnetic read heads encrypt data card information read from data cards using a number of techniques. In a number of embodiments, the magnetic read heads output the encrypted data card information using any number of known or proprietary communication protocols. In several embodiments, the magnetic read heads receive a signal from an external device requesting the transmission of encrypted data card information. In accordance with a number of embodiments of the invention, the magnetic read heads communicate data card information to computing devices and/or external devices via a network.

In many embodiments, the data card information read from a data card includes information related to an intrinsic magnetic characteristic of the data card and data recorded on the data card. The intrinsic magnetic characteristic can be thought of as a magnetic fingerprint of the data card. In several embodiments, the intrinsic magnetic characteristic is derived from a unique remanent noise characteristic of a data card.

In some embodiments, the magnetic fingerprint is used to authenticate the data card. In one such case, an authenticated magnetic fingerprint is stored within the read head and a data card authentication process is performed within the read head. In another case, the read head sends an encrypted magnetic fingerprint of a data card to an external server/device which provides a score indicative of the degree of correlation between the magnetic fingerprint read from the data card and a stored value indicative of the magnetic fingerprint of the authentic data card. In some embodiments, the magnetic read heads are used in conjunction with the card authentication techniques described in U.S. patent application Ser. No. 11/935,980, entitled "CARD AUTHENTICATION SYSTEM", which is hereby incorporated by reference in its entirety.

In many embodiments, the magnetic read head includes a magnetic sensor and an encryption circuit. In several embodiments, the encryption circuit and other circuitry are implemented using a single electronic chip such as an application specific integrated circuit (ASIC). In a number of embodiments, circuits on a single chip perform a variety of functions including data extraction and encryption. In other embodiments, the functions performed by the magnetic read head are implemented using a number of interconnected electronic chips. In several embodiments, the interconnected electronic chips are mounted on a common printed circuit board.

In a number of embodiments, magnetic read heads in accordance with the invention resist tampering and are shielded against tampering. In several embodiments, magnetic read heads are shielded by security enclosures that are configured to send a signal to the magnetic read head indicative of tampering. In such case, the magnetic read head can respond to the signal by erasing all stored data including any stored encryption keys. Embodiments of the magnetic read heads can also disable or destroy themselves upon an indication of tampering. In one embodiment, the security enclosure is a flexible material with a matrix of sensors that surrounds the magnetic read head or components of the magnetic read head. In other embodiments, magnetic read heads are protected against tampering by potting or gluing one or more components of the magnetic read head to a printed circuit board or other substrate that the components are mounted on. In such case, access to the internal signals of the magnetic read head is difficult and/or impossible without destruction or damage to the magnetic read head circuitry. In some embodiments, both security enclosures and potting are used.

A schematic view of a card transaction system including a magnetic read head in accordance with one embodiment of the invention is shown in FIG. 1. The card system 10 includes a magnetic read head 12, a computing device 14, a network 16, and an external device 18. The computing device 14 is connected to the magnetic read head 12. The network 16 connects the computing device 14 to the external device 18. In other embodiments, additional magnetic read heads can be connected to one or more computing devices. In several embodiments, additional networks and external devices are used.

In operation, the magnetic read head 12 senses a signal representative of information stored on a data card (not shown), extracts the data card information from the signal, encrypts at least a portion of the information, provides the encrypted information to external devices via the network, and resists tampering. In several embodiments, the magnetic read head includes a magnetic sensor (not shown) that is configured to read a magnetic stripe of a magstripe card. In many embodiments, the magnetic sensor obtains a signal indicative of the unique characteristics of the magnetic field of the magnetic stripe and information recorded to the magnetic stripe. In one embodiment, the information is obtained and extracted in accordance with the methods disclosed in U.S. Pat. No. 6,098,881 to Deland, Jr., et al. and U.S. Pat. Nos. 7,478,751, 7,210,627 and 7,377,433, which are hereby incorporated by reference in their entirety. The magnetic read head is configured to read multiple tracks of magnetic media on a magstripe card to obtain data card information in accordance with international standards such as ISO 7810, ISO 7811, ISO 7812 and/or ISO 7813. In other embodiments, the magnetic read heads read contact smart cards, contactless smart cards and/or other data cards. The data card information read by the magnetic read head can include information indicative of the unique magnetic characteristics of the data card (magnetic fingerprint) and recorded information. The recorded information can often include account numbers, expiration dates, the names of card users, identification numbers, and/or other information. The data card information is often valuable financial and/or identification information that is intended to be kept confidential.

The magnetic fingerprint extracted from a particular data card is a value, effectively unique, indicative of the intrinsic magnetic characteristic of the data card. In a number of embodiments, the magnetic fingerprint is derived from the remanent noise characteristics of the magnetic medium associated with a data card. The remanent noise characteristic is effectively unique for a particular data card. In some cases, the magnetic fingerprint is a 52 byte value generated using sampling techniques described in U.S. Pat. No. 6,098,881 to Deland, Jr., et al. and U.S. Pat. Nos. 7,478,751, 7,210,627 and 7,377,433.

In a number of embodiments, the read head is used as a component of a card authentication system. In some embodiments, the read head includes a memory that stores the magnetic fingerprints of a number of data cards (reference magnetic fingerprints) that might be swiped by a user. In such case, the read head authenticates a data card locally by comparing a magnetic fingerprint read from a swiped data card to the reference magnetic fingerprint stored in the memory. The degree of correlation between the transaction fingerprint (read from a data card swiped during a transaction) and the reference fingerprint can establish the authenticity of the data card. In other embodiments, the magnetic fingerprint read from the swiped data card (transaction magnetic fingerprint) is encrypted and sent to the external device. The external device can be a server configured to decrypt the transaction fingerprint and generate a score indicative of a degree of correlation between the transaction fingerprint and a stored reference fingerprint for the swiped data card. The read head can receive the score and make a decision as to the authenticity of the swiped data card based on the score. In a number of embodiments, the card authentication system can operate as described in U.S. patent application Ser. No. 11/935,980.

In some embodiments, the read head can engage in a mutual authentication process with the computing device or the external device. In such case, the read head can verify the computing device as being authentic before engaging in the transfer of information related to a swiped data card. Similarly, the computing device can verify the authenticity of the read head before engaging in the exchange of confidential information related to the transaction with the swiped data card. In such a process, each device can present identifying information to the other party. In some cases, the devices can present questions or challenges to the other party which are to be responded to in order to establish a secure connection. In a number of embodiments, the mutual authentication process can be implemented using the methods described in U.S. patent application Ser. No. 11/935,980.

In one embodiment using mutual authentication, the magnetic read head can be hardwired or programmed with a unique identification number such as a serial number. A device communicating with the magnetic read head, such as the computing device or external device, can request that the magnetic read head identify itself. The magnetic read head can respond by sending the identification number. The computing device can receive the identification number and verify that it matches the appropriate identification number stored in a database. In the event that the magnetic read head fails to identify itself with the correct identification number, the computing device can disable communication, provide a malfunction or tamper alert and/or take other appropriate action.

In some embodiments, encryption is used by the magnetic read head and associated systems, such as the computing device or external device, primarily to protect the magnetic fingerprint from a swiped data card. As a magnetic fingerprint can be difficult to obtain and comprehend for a common thief attempting to employ phishing or other method of stealing information, protecting the magnetic fingerprint can be very important. In systems exclusively employing devices capable of reading and verifying magnetic fingerprint information, the magnetic fingerprint and methods of obtaining the fingerprint become extremely valuable, and in some cases, potentially more valuable than the data recorded on the card. In such cases, a thief without the ability to duplicate the magnetic fingerprint is not likely to have the ability to complete a transaction involving a fake card or illegally obtained card data. The thief can thus be effectively foiled. For some embodiments, the read head primarily encrypts magnetic fingerprint information. In several embodiments, the read head also encrypts all data outputted from the read head.

In many embodiments, the magnetic read head encrypts data card information using a 56 bit data encryption standard (DES), Triple DES (equivalent of 168 bit encryption), derived unique key per transaction (DUKPT) or other suitable encryption techniques. In many embodiments, encryption techniques involving rotating keys are used. The DES or data encryption standard is a standard method for encrypting information and was made an official Federal Information Processing Standard by the U.S. Federal government. In operation, the DES algorithm takes a fixed-length string of plaintext bits and transforms it through a series of complicated operations using a key into a ciphertext bitstring, or an encrypted representation of the plaintext, of the same length. Decryption of the ciphertext bitstring can generally only be performed using the encryption key. The DES encryption key is effectively 56 bits in length. The Triple DES technique is an improvement to the DES technique. Triple DES performs the DES technique three times giving it effectively 168 bits for the encryption key length.

The DUKPT technique is a key management scheme where each transaction uses a unique key derived from a fixed key. The American National Standards Institute (ANSI) maintains the DUKPT standard (ANSI X9.24). Deriving a unique key for every transaction from the fixed key prevents the use of any one unique key to decrypt subsequent messages. In several embodiments, both devices exchanging information using DUKPT must have the fixed key. In one embodiment implementing the DUKPT technique, the magnetic read head is initialized with a base derivation key (fixed key) which is used to generate a chain of keys. In such case, the computing device 14 and/or external device 18, whichever is the target of communications with the magnetic read head, also stores the base derivation key. In this way, each device is capable of determining which unique key is to be used for a given communication transaction using a DUKPT algorithm known to each device.

In other embodiments, the magnetic read head is capable of encrypting data card information using any encryption technique known in the art. In several embodiments, the magnetic read head is capable of storing one or more encryption keys, where the number of keys stored depends on the technique used.

The magnetic read head 12 can be connected to the computing device 14 in a number of ways. In one embodiment, the magnetic read head is connected to the computing device 14 using RS 232, RS 422, RS 485, EIA 530, Ethernet, USB or another physical layer protocol for connecting communications equipment. In other embodiments, other protocols and physical mediums can be used to connect the magnetic read head 12 and computing device 14. In one embodiment, the magnetic read head and computing device can communicate using a serial peripheral interface bus (SPI). In another embodiment, the magnetic read head and computing device can communicate using a inter-integrated circuit (I2C) bus. In yet another embodiment, the magnetic read head and computing device communicate by interfaces including serial shift-out registers. In several embodiments, the magnetic read head can use proprietary communication methods to communicate with the computing device. In operation, magnetic read head can communicate bidirectionally with the computing device. The bidirectional communication can be full duplex, half duplex or another appropriate protocol.

In the illustrated embodiment, the computing device 14 receives encrypted information from the magnetic read head and uses the information to access card user records and/or process card user transactions. The card user records can be stored in a database local to the computing device 14 or on the external device 18. Card user transactions can include verifying the validity of the data card or the data card user's identification information, initializing the data card, processing purchases using the data card, checking for authorized use or processing other transactions involving the card user's records. The computing device can be a personal computer, terminal, point of sale (POS) device, server, or any other device capable of communicating with the magnetic read head. The computing device 14 can communicate with the external device 18 via the network 16. In one embodiment, the computing device is not connected to a network. The computing device can store one or more encryption keys for communicating with the magnetic read head and/or the external device.

The network 16 can be either a public or private network. In one embodiment, all or a portion of the data communicated over the network is encrypted to protect the privacy of information passing through the network. Although a simple network topology is shown in FIG. 1, a server/client network, a peer to peer network or other suitable network can be used. In a common embodiment, communication takes place over a secure private data network. In other embodiments, the network includes public networks such as the Internet, public LANs, WIFI, cellular or other data networks. In one embodiment, any network capable of supporting the encryption technique implemented by the magnetic read head can be used.

The external device 18 can be a personal computer, server or other computing device capable of communicating over the network and decrypting data card information. In one embodiment, the external device need not be capable of decrypting data card information, such as in the case when the network is secure. In several embodiments, the external device includes a database having user records associated with one or more data cards. A typical physical location for the external device is a branch bank or other financial institution. The records can include information such as the card user's name, account number, a unique identifier, a password, personal identification number (PIN), the magnetic fingerprint of the card, a picture of the card user, a fingerprint of the card user, or other user information. The external device can store one or more encryption keys for communicating with the magnetic read head and/or computing device.

Figure 2:
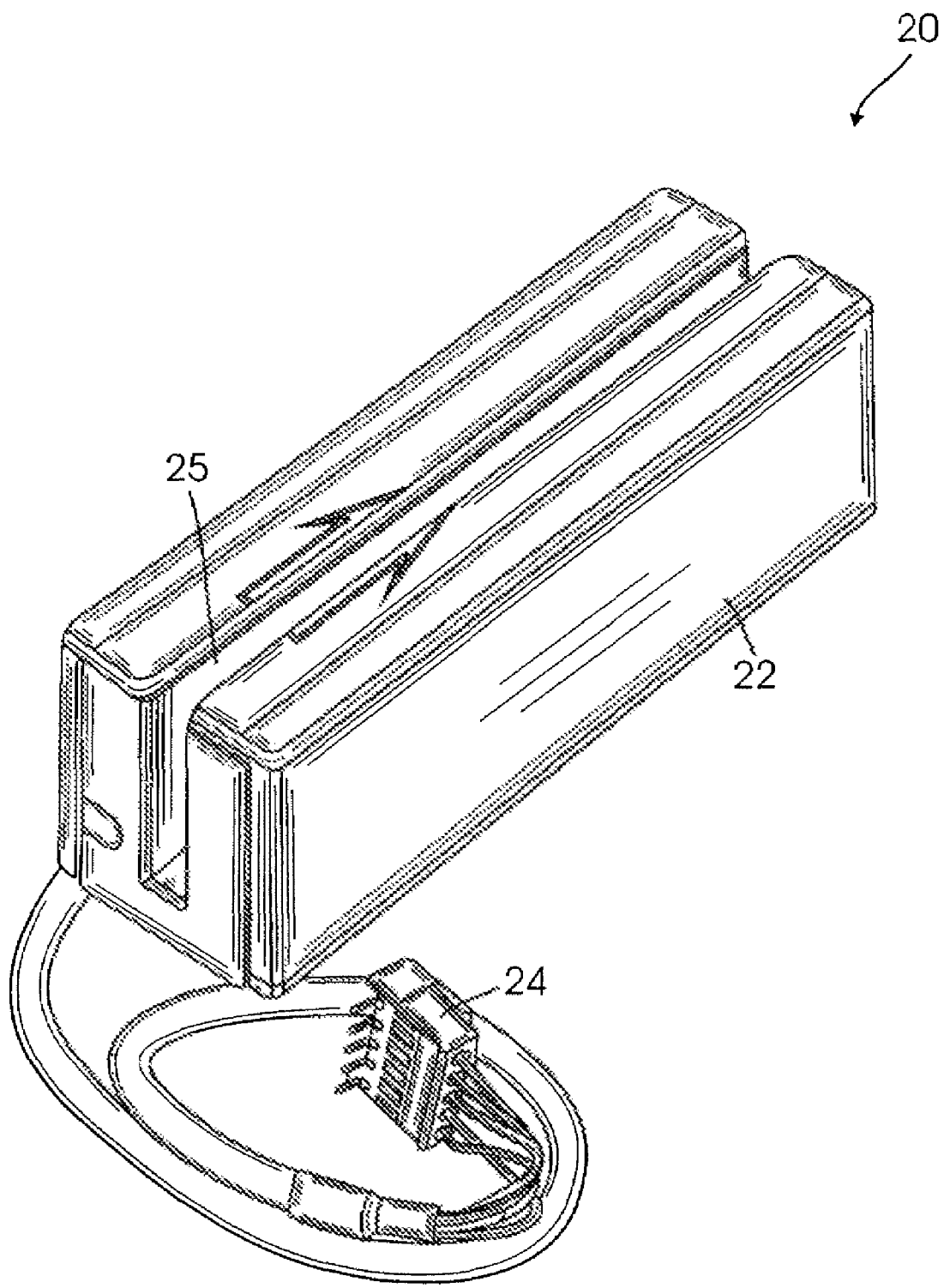
FIG. 2 is a perspective view of a card reader in accordance with an embodiment of the invention.

A perspective view of a card reader in accordance with an embodiment of the invention is shown in FIG. 2. The card reader 20 includes a housing 22 having a slot 25, a magnetic read head (not shown) and a wiring interface 24. The wiring interface 24 exits an opening (not shown) in the housing 22. The slot 25 is configured to receive a data card (not shown). The wiring interface 24 is configured to connect to a computing device (not shown), such as the computing device of FIG. 1. The wiring interface can carry signals such as power, ground, serial data, clock or other signals appropriate for communicating with a computing device. Although the illustrated embodiment of the wiring interface shows five conductors, other embodiments can include more than or less than five conductors. The number of conductors often depends on the physical layer protocol to be implemented, such as RS 232 or the like.

In operation, the magnetic read head can operate similar to the embodiment of a magnetic read head discussed above in relation to FIG. 1.

Figure 3:
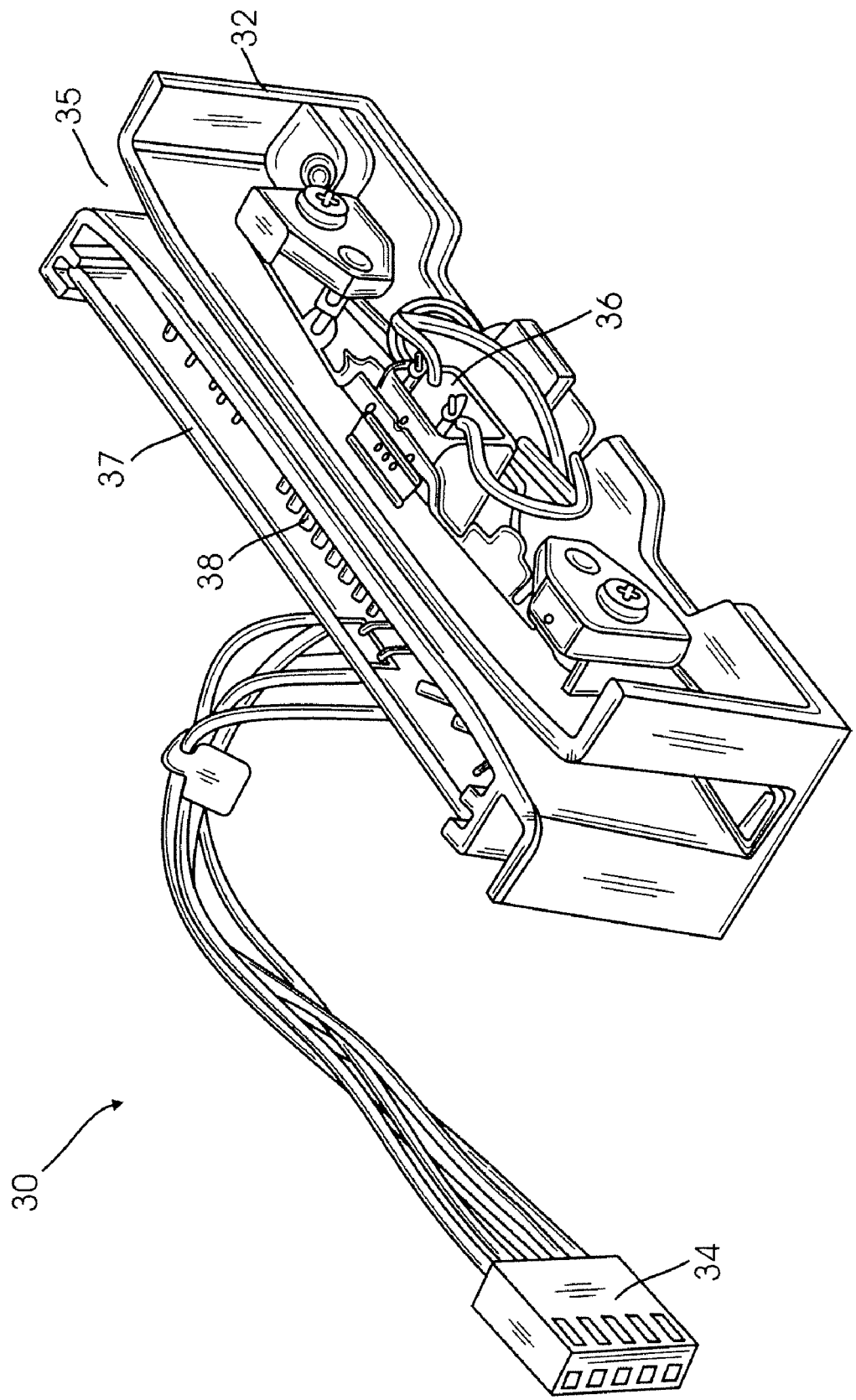
FIG. 3 is a perspective view of a card reader that is similar to the card reader of FIG. 2 without an exterior housing in accordance with an embodiment of the invention.

A perspective view of a card reader that is similar to the card reader of FIG. 2 without an exterior housing in accordance with an embodiment of the invention is shown in FIG. 3. The card reader 30 includes an internal housing 32, a wiring interface 34, a card slot 35, a magnetic read head 36, a printed circuit board 37, and an encryption circuit 38. The printed circuit board 37 connects the wiring interface 34 and the magnetic read head 36 to the encryption circuit 38. The printed circuit board 37 is mounted within the internal housing 32. The internal housing 32 is shaped to form the card slot 35, which is configured to receive a data card.

In operation, a card user or operator slides a data card (not shown) through the card slot. The magnetic read head reads information from the data card during the sliding process and provides it to the encryption circuit. The magnetic read head generates an analog signal representative of the magnetic field of the magnetic medium on the data card. The magnetic field can include recorded information such as data encoded using magnetic flux transitions and inherent information such as the remanent noise of the magnetic medium. In many embodiments, the inherent information is used as a unique identifier of the data card. The encryption circuit receives the analog signal, extracts the stored and/or inherent information, encrypts the extracted information and outputs the encrypted information via the wiring interface. As with the embodiment of FIG. 2, the wiring interface of the embodiment of FIG. 3 can carry signals such as power, ground, serial data, clock or any other signals appropriate for communicating with the computing device.

In the illustrated embodiment, the magnetic sensor and the encryption circuit 38 are implemented separately. In other embodiments, the magnetic sensor and encryption circuit are integrated within a single chip. In such case, the integrated chip can be protected by a security enclosure.

Figure 4:
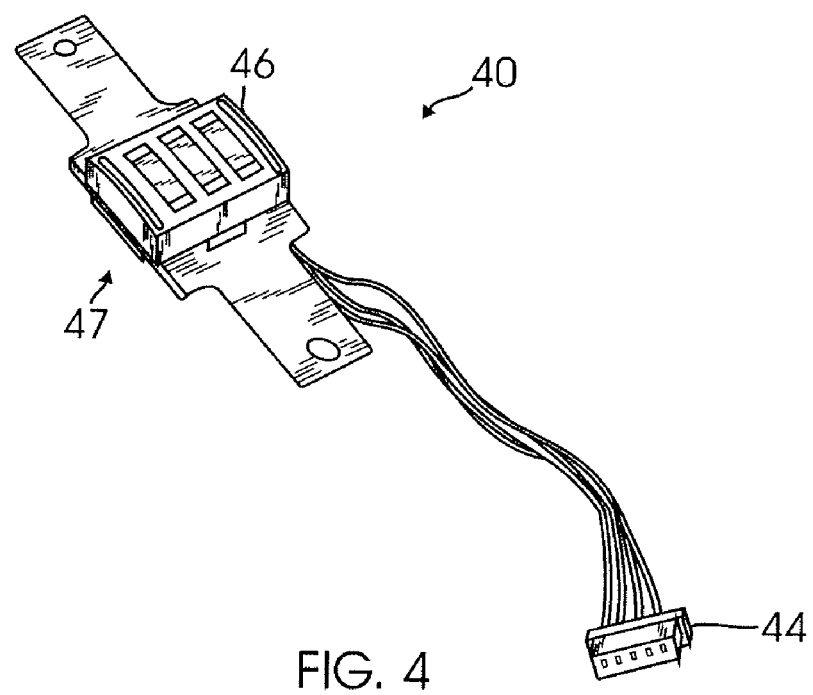
FIG. 4 is a perspective view of a magnetic read head in accordance with an embodiment of the invention.

A perspective view of a magnetic read head in accordance with an embodiment of the invention is shown in FIG. 4. The magnetic read head 40 includes a wiring interface 44, a magnetic sensor 46, and a printed circuit board 47 (not visible). In several embodiments, the printed circuit board includes an encryption circuit. The magnetic read head can operate as described in the discussion of FIG. 1.

Figure 5:
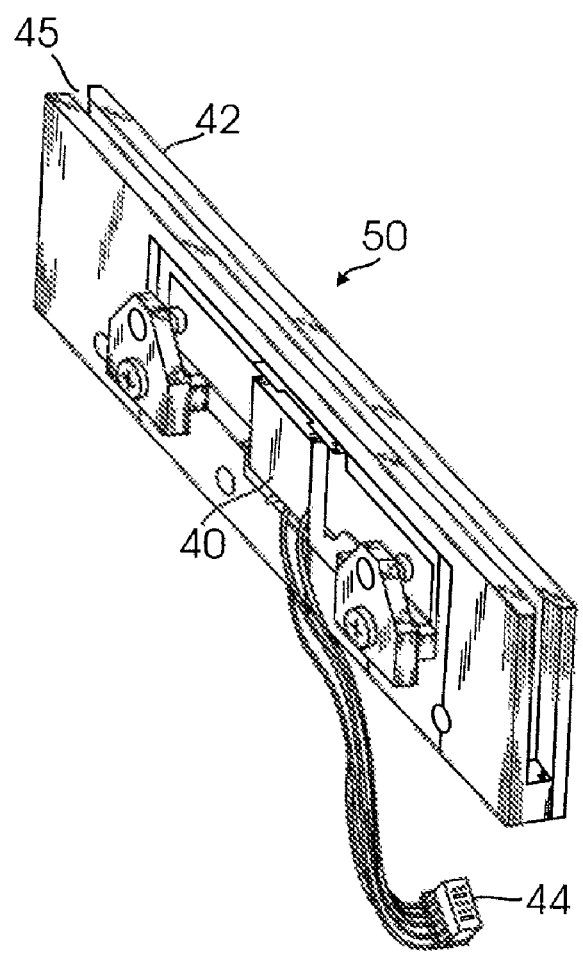
FIG. 5 is a perspective view of a card reader including the magnetic read head of FIG. 4 in accordance with an embodiment of the invention.

A perspective view of a card reader including the magnetic read head of FIG. 4 in accordance with an embodiment of the invention is shown in FIG. 5. The card reader 50 includes a housing 42, a wiring interface 44, a card slot 45, and a magnetic read head 40. The magnetic read head 40 includes a magnetic sensor (not shown) and an encryption circuit (not shown). In the illustrated embodiment, the magnetic read head is implemented in a single enclosure or single ASIC. The magnetic read head can operate as described for the embodiments of FIG. 1.

Figure 6:
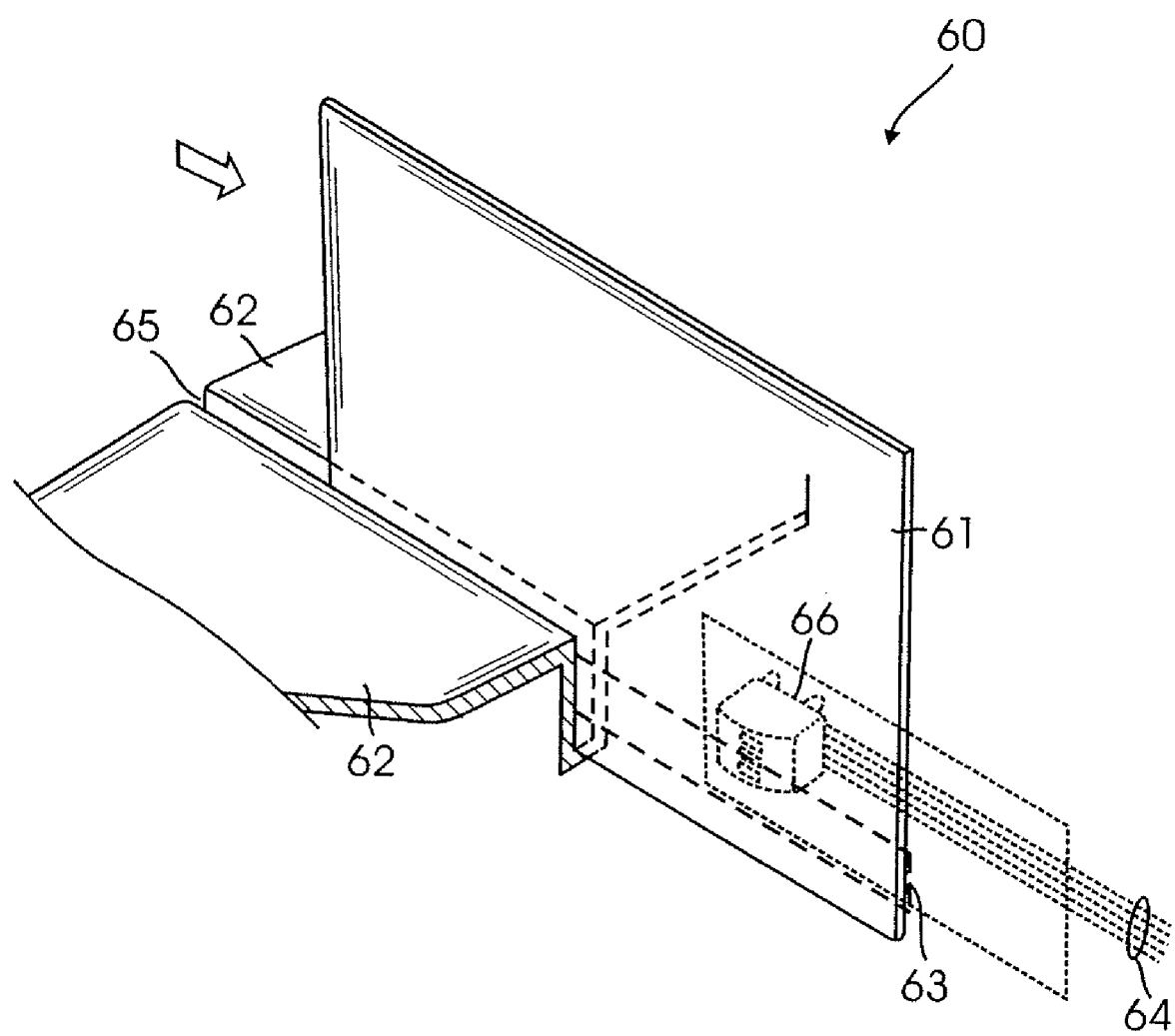
FIG. 6 is a fragmental perspective view of a card reader system with a magnetic stripe card in accordance with an embodiment of the invention.

A perspective view of a card reader system with a magnetic read head and a magnetic stripe card in accordance with an embodiment of the invention is shown in FIG. 6. The card reader system 60 includes a data card 61, a housing 62, a wiring interface 64 and a magnetic read head 66. In the illustrated embodiment, the data card 61 is a magnetic stripe card and includes a magnetic stripe 63 having three tracks (tracks not shown). In other embodiments, the magnetic stripe can have more than or less than three tracks. In several embodiments, the data card 41 and/or magnetic stripe can comply with international standards such as ISO 7810, ISO 7811, ISO 7812, ISO 7813 or another appropriate standard. Each of the tracks can contain stored information. In other embodiments, other types of data cards are used with the read head, such as a contact smart card, a contactless smart card or other card capable of storing information on the card.

The housing 62 has a passageway or card slot 65 configured to receive the data card 61. In the illustrated embodiment, the wiring interface 64 includes five conductors. In other embodiments, the wiring interface can have more than or less than five conductors. The conductors can carry signals such as power, ground, transmit data, receive data and control. In one embodiment, a shift data output is used to output information. In other embodiments, the conductors can carry the signals appropriate for the particular wiring interface.

In the illustrated embodiment, the magnetic read head 66 includes a magnetic sensor and an encryption circuit (not shown). In several embodiments, the encryption circuit is implemented on a PCB located within a housing enclosing the magnetic read head 66. The magnetic sensor can be located within the housing along with the encryption circuit. In the illustrated embodiment, the magnetic read head includes three magnetic sensors, each capable of reading from a track of information recorded on a magnetic stripe card. The magnetic sensors are configured to align with and read the three tracks (not shown) of the magnetic stripe 63. The three tracks can be arranged in accordance with the ISO 7811, which specifies the location of the encoded tracks among other details. The magnetic read head encryption circuit can operate as described previously in the discussion of FIG. 1.

Figure 7:
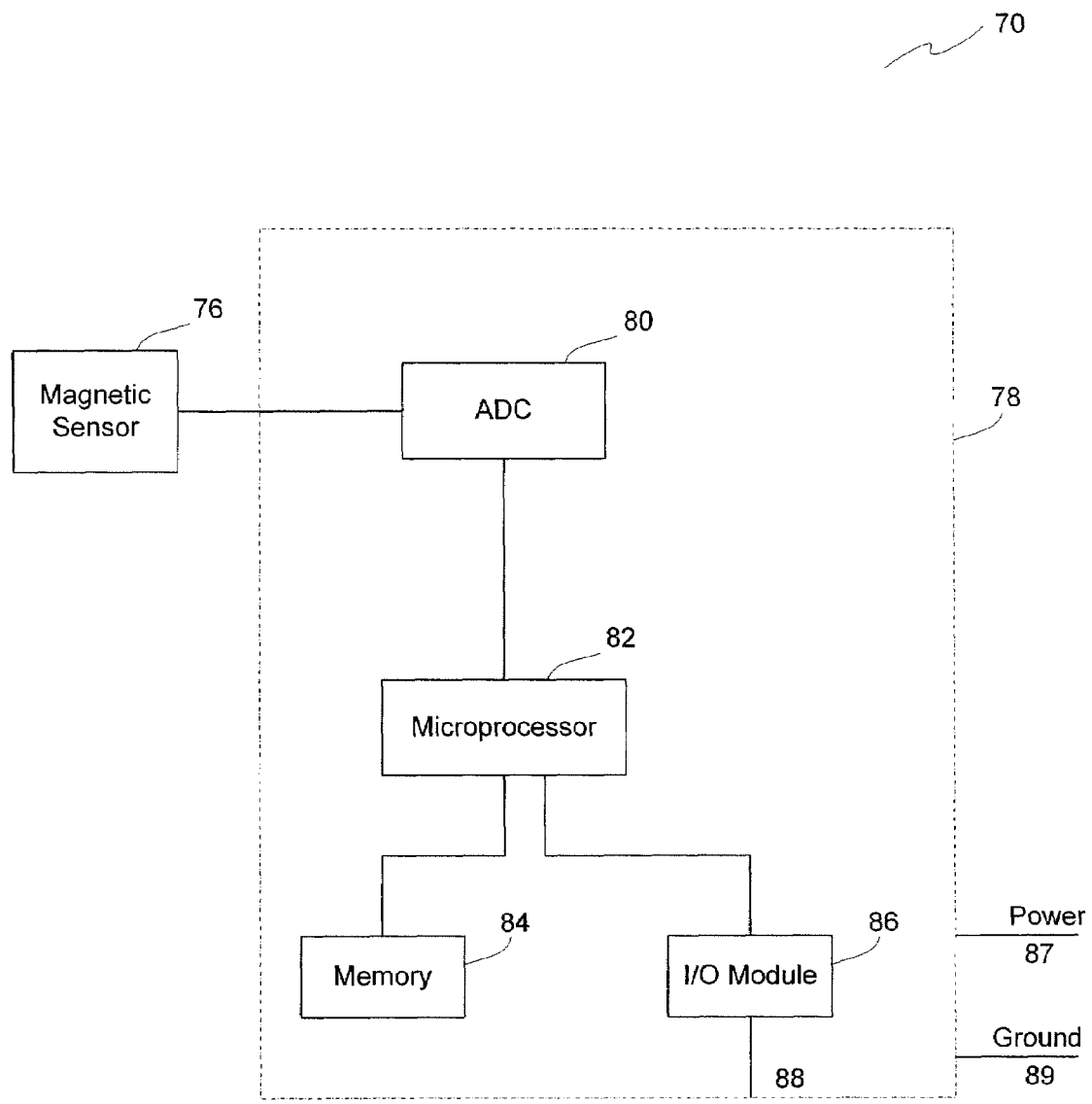
FIG. 7 is a high level schematic circuit diagram of a magnetic read head in accordance with an embodiment of the invention.

A high level schematic circuit diagram of a magnetic read head in accordance with an embodiment of the invention is shown in FIG. 7. The magnetic read head 70 includes a magnetic sensor 76 and an encryption circuit 78. The encryption circuit 78 includes an analog to digital converter (ADC) 80, a microprocessor 82, a memory 84, an I/O module 86, a serial data interface 88, a power connection 87, and a ground connection 89. The microprocessor 82 is connected to the ADC 80, the memory 84, the I/O module 86, the power connection 87 and the ground connection 89. The ADC 80 is connected to the magnetic sensor 86. The power connection 87 and the ground connection 89 can be connected to any component in the encryption circuit 78. The I/O module 86 is connected to the serial data interface 88. The serial data interface 88 can be a single conductor or any number of conductors.

In several embodiments, the serial data interface includes a single conductor configured to carry serial data or shift data. In other embodiments, multiple conductors can used to implement other physical layer protocols for connecting communications equipment. In one embodiment, the microprocessor is configured to receive one or more signals indicating when to start sending data and when to stop sending data. In embodiments supporting different physical layer protocols, the I/O module can include any number of communication circuits such as drivers, receivers and the like for transmitting and receiving information via the serial data interface 88. In other embodiments, the serial data interface 88 is replaced by an interface that supports parallel data transfer of data.

The memory 84 can include both volatile (e.g., RAM) and non-volatile memory (e.g., EEPROM). In one embodiment, the memory includes only non-volatile memory. The non-volatile memory can store configuration information for the microprocessor, encryption keys, a unique reader serial number, and/or the reference magnetic fingerprints of a group of data cards. In one embodiment, the memory is programmed with a single encryption key (i.e. DES, triple DES or the like). In another embodiment, the memory is programmed with a base derivation key, or fixed key, to be used in conjunction with the DUKPT encryption technique.

In operation, the encryption circuit 78 is initialized or seeded with one or more encryption keys. In one embodiment, the encryption keys are stored in the memory 84. In other embodiments, the encryption keys are hard wired within the microprocessor or upon the initialization of the microprocessor via the non-volatile memory. In other embodiments, the microprocessor is capable of being configured with encryption keys on the fly by a computing device or external device, such as either of those devices depicted in FIG. 1.

The magnetic sensor 76 is capable of reading magnetic media. Often the magnetic media read is a magnetic stripe of a data card. The magnetic media can store both recorded information and information inherent to the magnetic media. The inherent information is often unique, or effectively unique, to the particular magnetic media. In one embodiment, the inherent information is indicative of the remanent noise characteristics of the magnetic media which can be referred to as a magnetic fingerprint. The recorded information can include things such as card user names, account numbers and the like. In some embodiments, the details of the unique magnetic fingerprint of the magnetic media also stored in an encrypted form on the card. Including the details of the magnetic fingerprint can enable the card to be self authenticating. In embodiments where a magnetic fingerprint is used to authenticate the data card, the location of the unique magnetic fingerprint can be proprietary such that an attacker cannot obtain information concerning the fingerprint from the analog output of the magnetic sensor. By encrypting the magnetic fingerprint within the magnetic read head, the fingerprint extracted from the analog signal is concealed from attackers.

In operation, the encryption circuit 78 of the embodiment illustrated in FIG. 7 receives an analog signal from the magnetic sensor 76 when a card user or operator swipes a data card through the magnetic sensor 76. In other embodiments, other methods of moving the magnetic read head with respect to the magnetic medium can be used. In many embodiments, the analog signal is representative of data card information that includes both recorded information and a magnetic fingerprint. The ADC receives the analog signal and converts it into a digital signal.

The microprocessor 82 receives the digital signal from the ADC and extracts information from the digital signal using methods described in the afore-mentioned patents, U.S. Pat. No. 6,098,881 to Deland, Jr., et al. and U.S. Pat. Nos. 7,478, 751, 7,210,627 and 7,377,433. In a number of embodiments, the microprocessor extracts a magnetic fingerprint and recorded data from the digital signal. The microprocessor stores the extracted information in memory located within the microprocessor (not shown) or in memory 84. The microprocessor then encrypts the information using one or more of the encryption keys stored in the memory. In one embodiment, the microprocessor can assemble the encrypted information into one or more packets. In other embodiments, the encrypted information is stored sequentially for serial transmission.

In several embodiments, the microprocessor outputs the encrypted information from the encryption circuit via the I/O module. In other embodiments, the microprocessor outputs the encrypted information directly and the I/O module is not used. In one embodiment, the physical layer protocol includes a number of communication handshakes enabling communication with a computing device after the microprocessor has been initialized for communication. In such case, the computing device can include a method for indicating to the encryption circuit to slow down or stop the output of encrypted information from the microprocessor.

In one embodiment, the encryption circuit is implemented within a single chip such as an ASIC. In other embodiments, the encryption circuit is implemented in multiple chips sharing encrypted information. In the illustrated embodiment, the microprocessor is implemented as a single unit. In other embodiments, the microprocessor can be implemented using any combination of processors, memory, discrete logic components, data buses and/or other processing elements that share information. In some embodiments, the encryption circuit is implemented using an ASIC that incorporates both digital components and analog components, such as a mixed-mode ASIC. In such case, any number of components common to a data card reader are included within the mixed-mode ASIC. In some embodiments, these components may include drivers related to the communication interface associated with the read head.

Irrespective of the implementation of the encryption circuit, the components of the encryption circuit can be potted or glued to a printed circuit board or other substrate to prevent tampering in accordance with several embodiments of the invention. In many embodiments, the glue or other tamper resistant adhesive is resistant to solvents such that it can only be removed in a manner causing the destruction or substantial damage to the encryption circuit. In one embodiment, the glue or other tamper resistant adhesive is designed to provide visible evidence of tampering in the event that an attacker tampers with the adhesive.

In many embodiments, the extracted magnetic fingerprint is used to authenticate the data card. In one such case, the microprocessor or memory stores a group of authenticated magnetic fingerprints (reference fingerprint) and a data card authentication process is performed within the read head. The authentication process can include determining the authenticity of a data card based on a degree of correlation between the magnetic fingerprint read from the data card during a transaction (transaction fingerprint) and the reference magnetic fingerprint. In another case, the microprocessor sends the encrypted transaction fingerprint of a data card to an external server/device which provides a score indicative of the degree of correlation between the transaction fingerprint and a stored reference fingerprint. The microprocessor or computing device can receive the score and determine the authenticity of the data card based on the score. In some embodiments, the magnetic read heads are used in conjunction with the card authentication techniques described in U.S.

patent application Ser. No. 11/935,980, entitled "CARD AUTHENTICATION SYSTEM", which is hereby incorporated by reference in its entirety.

Figure 8:
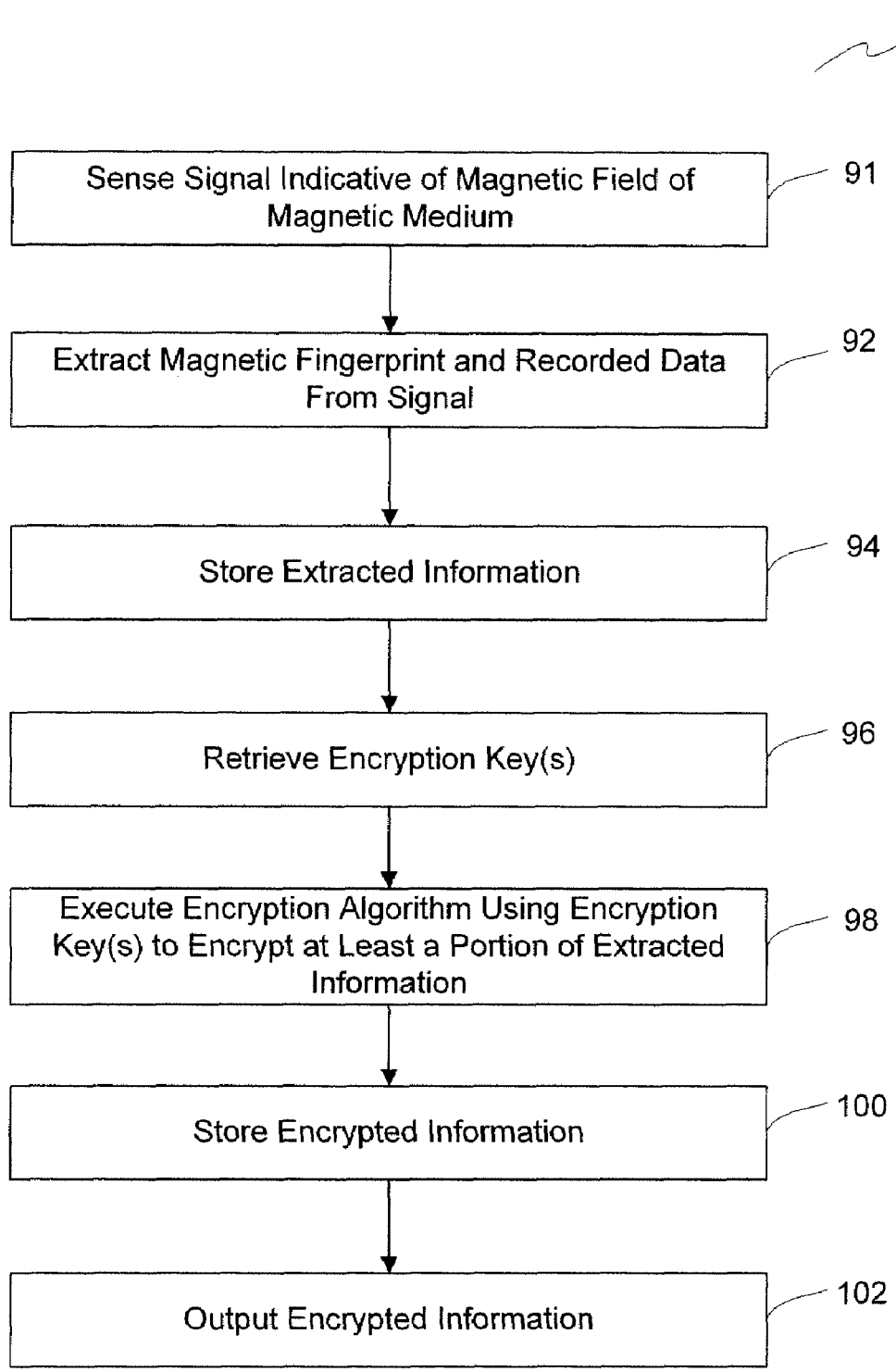
FIG. 8 is a flowchart of a process for operating a magnetic read head in accordance with an embodiment of the invention.

A flowchart of a process for encrypting information in accordance with an embodiment of the invention is shown in FIG. 8. The process 90 first senses (91) a signal indicative of a magnetic field of a magnetic medium. The process extracts (92) the magnetic fingerprint and the recorded data from the signal in accordance with methods described in the aforementioned patent, U.S. Pat. Nos. 7,478,751, 7,210,627 and 7,377,433. The process stores (94) the extracted information. The process then retrieves (96) one or more encryption keys. The process executes (98) the appropriate encryption algorithm using the one or more encryption keys to encrypt at least a portion of the extracted data card information. The process stores (100) the encrypted information. The process then outputs (102) the encrypted information. In a number of embodiments, the above processes are performed in different sequences. In several embodiments, a subset of the above processes are performed and/or additional processes are performed.

In a number of embodiments, a mutual authentication process establishes the authenticity of the reader before the encryption process outputs recorded data.

Figure 9:
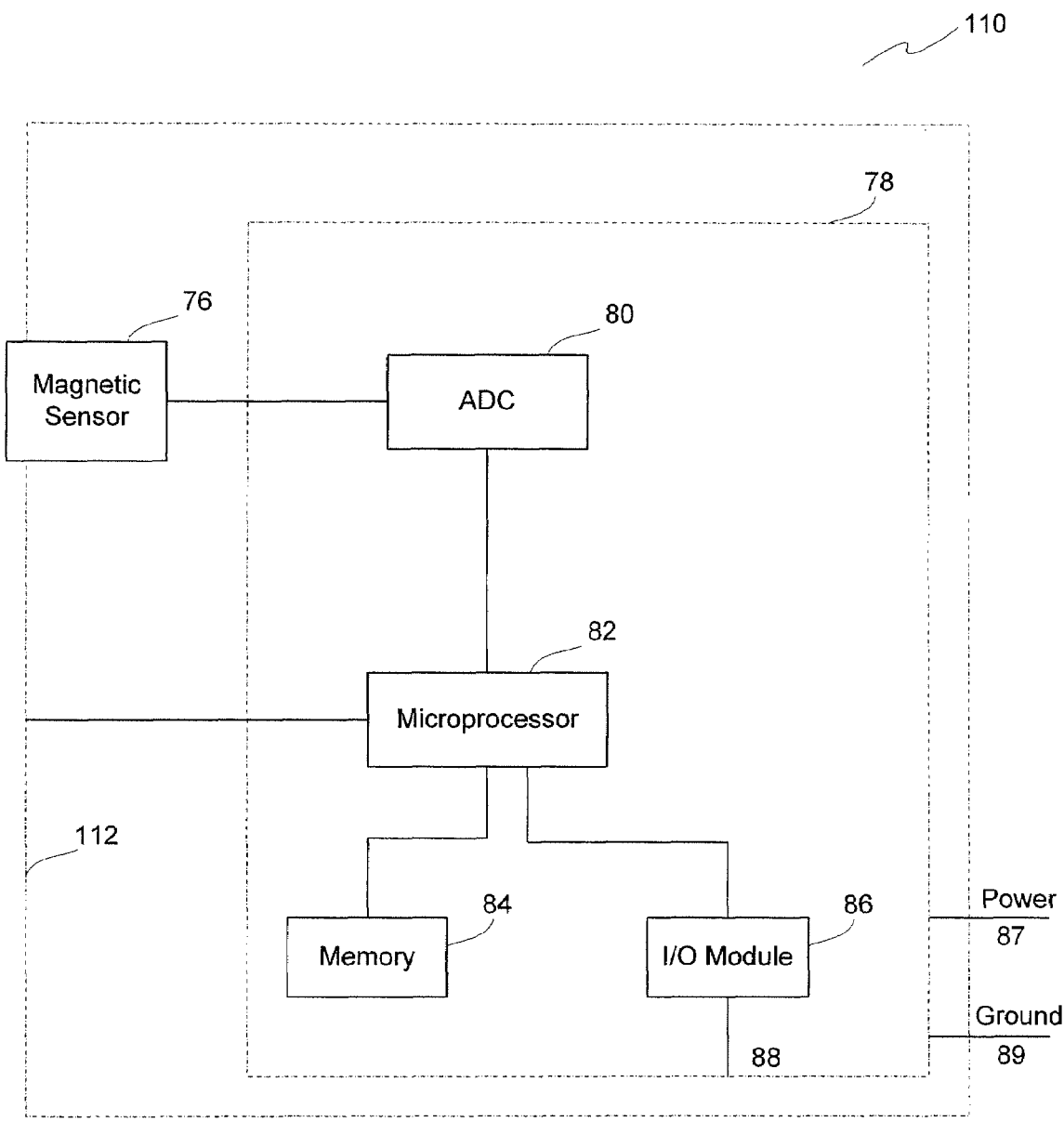
FIG. 9 is a high level schematic circuit diagram of a magnetic read head with a security enclosure in accordance with an embodiment of the invention.

A technique in accordance with embodiments of the invention for resisting tampering involves using an electronic security enclosure to encapsulate the components of a magnetic read head. A schematic block diagram of a magnetic read head having a security enclosure in accordance with an embodiment of the invention is shown in FIG. 9. The magnetic read head 110 includes the same components as the embodiment of FIG. 7 with the addition of a security enclosure 112. The security enclosure 112 is connected to the microprocessor 72. The security enclosure 112 can surround the magnetic sensor 66 and encryption circuit 78 such that any tampering with either component is detected by the security enclosure 112. In several embodiments, the security enclosure 112 surrounds both the magnetic sensor 76 and the encryption system 78. In the illustrated embodiment, the security enclosure 112 encloses the encryption circuit and a portion of the magnetic sensor protrudes through an opening in the security enclosure 112. In several embodiments, the security enclosure is adhered to a PCB (not shown) such that the security enclosure and PCB completely encloses the encryption system and the magnetic sensor. In this way, tampering can be detected and can result in the disengagement/disablement of the components mounted on the PCB. In one embodiment, the security enclosure is a flexible grid capable of detecting puncture or other tampering. In one embodiment, the security enclosure is implemented as a matrix of conductive ink traces, such as with the Tamper Respondent Surface Enclosure of W. L. Gore and Associates of Elkton, Md.

In the event that an attacker tampers with the security enclosure 112, the security enclosure 112 sends a signal to the microprocessor 82 indicating the breach. In this case, tampering can include the puncture, tearing or other attempted breach of the enclosure. In one embodiment, the security enclosure can detect heat, electricity or other forms of tampering. The microprocessor can respond by initiating a destruction sequence that includes erasing encryption keys, memory and any other appropriate information. In such case, the microprocessor can also disable the encryption and/or magnetic sensor systems.

In one embodiment, the microprocessor responds to a breach or attempted breach by communicating the breach or attempted breach to devices connected to the magnetic read head. In one embodiment, the microprocessor disables itself. In another embodiment, the microprocessor erases all of its executable code stored in memory or elsewhere. In yet another embodiment, the microprocessor reduces itself to a pseudo functional state where the only function the microprocessor performs is reporting the breach or attempted breach of the magnetic read head. In such case, the microprocessor can also report the type or method of the breach or attempted breach. In one embodiment of the pseudo functional state, only the executable code required to function in the pseudo functional state is preserved while all other information is erased.

Figure 10:
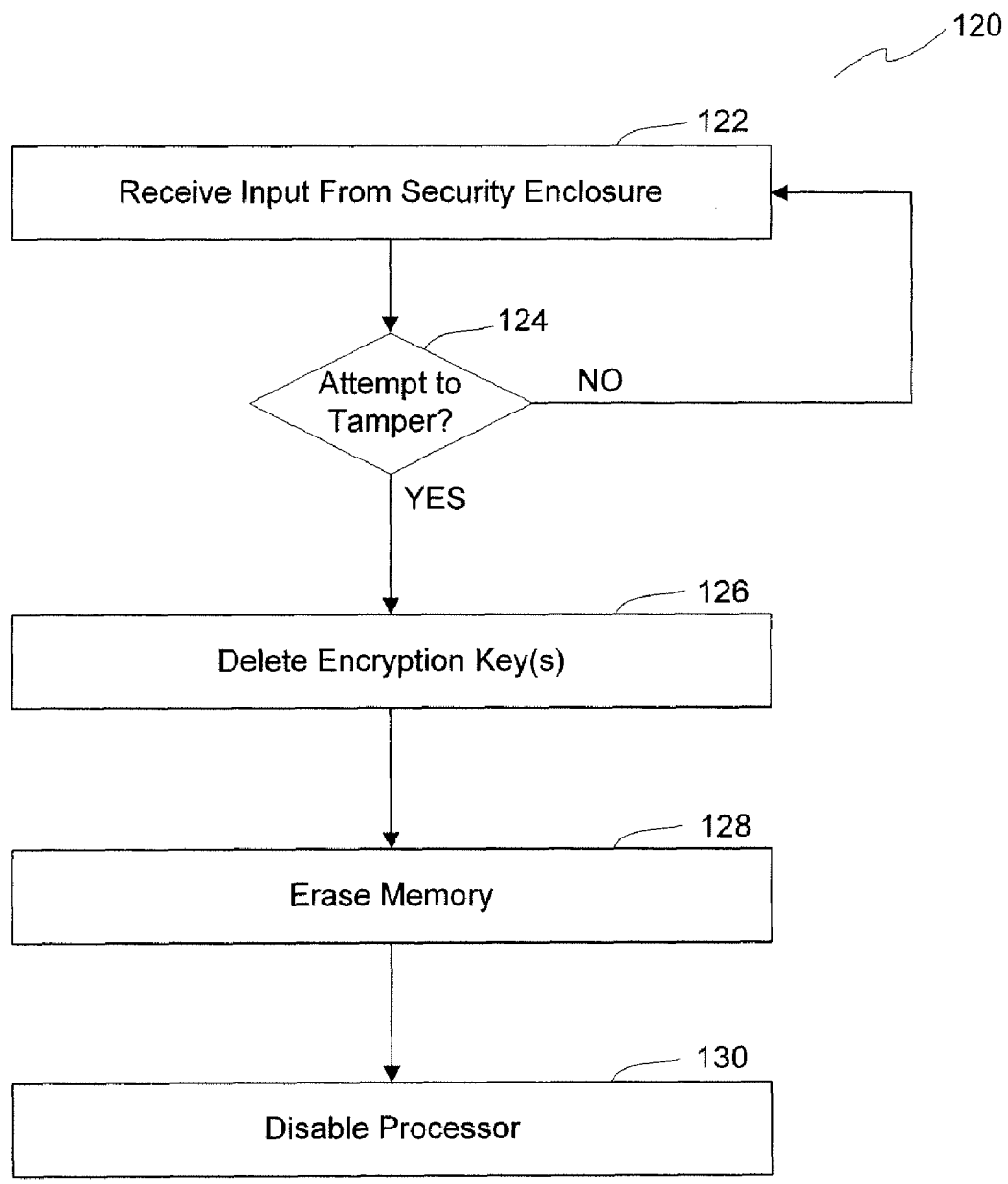
FIG. 10 is a flowchart of a process for operating a magnetic read head in response to tampering in accordance with an embodiment of the invention.

A flowchart of a process for responding to tampering in accordance with an embodiment of the invention is shown in FIG. 10. The process 120 begins when the process receives (122) input from the security enclosure. In other embodiments, other security devices can provide the input to the process relating to tampering. The process determines (124) whether the input indicates an attempt to tamper. In the event that the input does not indicate an attempt to tamper, then the process returns to receiving (122) input from the security enclosure. In the event that the input indicates an attempt to tamper, the process deletes (126) information such as encryption keys. The process can also erase (128) memory. The process can disable (130) the processor. In one embodiment, the process takes other actions facilitating the shutdown of the processor and/or the destruction of any stored data. In a number of embodiments, the above processes are performed in different sequences. In several embodiments, a subset of the above processes are performed and/or additional processes are performed.

Variations, modifications, and other implementations of what is described herein will occur to those of ordinary skill in the art without departing from the spirit and the scope of the invention as claimed. Although the invention has been described with respect to certain embodiments, it should be recognized that the invention includes the claims and their equivalents supported by this disclosure.

What is claimed is:

1. A read head configured to read a data card having an intrinsic magnetic characteristic and recorded data on the data card, the read head comprising:
   a magnetic sensor having a housing, the magnetic sensor configured to generate an analog signal indicative of the intrinsic magnetic characteristic and the recorded data;
   an analog to digital converter located within the housing and coupled to the magnetic sensor, the analog to digital converter configured to convert the analog signal into a digital signal; and
   a processor located within the housing and coupled to the analog to digital converter, the processor configured to:
      receive the digital signal;
      generate a magnetic fingerprint based on the intrinsic magnetic characteristic from the digital signal;
      extract the recorded data from the digital signal;
      encrypt at least a portion of the recorded data;
      store the magnetic fingerprint and the recorded data; and
      output the encrypted at least the portion of the recorded data.

2. The read head of claim 1, wherein the processor is further configured to:
   encrypt the magnetic fingerprint; and
   output the encrypted magnetic fingerprint.

3. The read head of claim 2:
   wherein the processor is configured to output the encrypted magnetic fingerprint to a server;
   wherein the processor is configured to encrypt the magnetic fingerprint using a shared encryption key; and wherein the server is configured to:
receive the encrypted magnetic fingerprint;
decrypt the encrypted magnetic fingerprint using the shared encryption key;
generate a score indicative of a degree of correlation between the magnetic fingerprint and a reference magnetic fingerprint; and
output the score.

4. The read head of claim 3, wherein the processor is configured to receive the score and to determine the authenticity of the data card based on the score.

5. The read head of claim 1, wherein the processor is configured to output a portion of the recorded data unencrypted.

6. The read head of claim 1, further comprising a memory coupled to the processor, the memory configured to store at least one encryption key.

7. The read head of claim 6, wherein the processor is configured to enable remote encryption key loading.

8. The read head of claim 1, wherein the read head is configured to engage in a mutual authentication process with an external device.

9. The read head of claim 8, wherein the external device is any of a point of sale terminal and a remote server.

10. The read head of claim 1, further comprising a memory coupled to the processor, the memory configured to store a unique identifier for the read head.

11. The read head of claim 10:
wherein the processor is configured to provide the unique read head identifier to a server; and
wherein the server is configured to authenticate the read head based on a comparison of the unique read head identifier and a stored read head identifier value.

12. The read head of claim 11:
wherein the server is configured to provide a unique server identifier to the read head; and
wherein the read head is configured to authenticate the server based on a comparison of the unique server identifier and a stored server identifier value.

13. The read head of claim 1, wherein the processor and the analog to digital converter are implemented using a single integrated circuit chip.

14. The read head of claim 1, further comprising a memory coupled to the processor, the memory configured to store at least one reference magnetic fingerprint, wherein the processor is further configured to determine an authenticity of the data card based on a degree of correlation between the magnetic fingerprint and one of the at least one stored reference magnetic fingerprint.

15. The read head of claim 1:
wherein the read head is coupled to a computing device coupled to a network coupled to a server; and
wherein the processor is configured to output the encrypted at least the portion of the recorded data to at least one of the computing device and the server.

16. The read head of claim 1, further comprising a security enclosure configured to at least partially enclose the analog to digital converter, the processor, and the magnetic sensor.

17. The read head of claim 16, wherein the security enclosure is configured to detect a breach of the security enclosure and to send a signal to the processor indicative of the breach.

18. The read head of claim 17, wherein the processor is configured to, based on the signal from the security enclosure, perform any of erasing a memory coupled to the processor and disabling, at least partially, the processor.

19. The read head of claim 16, wherein the security enclosure is a tamper resistant material.

20. The read head of claim 1, wherein the housing at least partially encloses the magnetic sensor.

21. The read head of claim 1, wherein the magnetic sensor, the analog to digital converter and the processor are mounted on a printed circuit board located within the housing.

22. A method for reading a data card having an intrinsic magnetic characteristic and recorded data on the data card using a read head comprising a magnetic sensor having a housing, an analog to digital converter located within the housing and a processor located within the housing, the method comprising:
generating, within the housing, an analog signal indicative of the intrinsic magnetic characteristic and the recorded data of the data card;
converting, within the housing, the analog signal into a digital signal;
generating, within the housing, a magnetic fingerprint based on the intrinsic magnetic characteristic from the digital signal;
extracting, within the housing, the recorded data from the digital signal;
encrypting, within the housing, at least a portion of the recorded data;
storing, within the housing, the magnetic fingerprint and the recorded data; and
outputting, from within the housing, the encrypted at least the portion of the recorded data.

23. The method of claim 22, further comprising:
encrypting the magnetic fingerprint; and
outputting the encrypted magnetic fingerprint.

24. The method of claim 23:
wherein the outputting the encrypted magnetic fingerprint includes outputting the encrypted magnetic fingerprint to a server;
wherein the encrypting at least the portion of the recorded data includes encrypting at least the portion of the recorded data using a shared encryption key;
the method further comprising:
receiving, at the server, the encrypted magnetic fingerprint;
decrypting, at the server, the encrypted magnetic fingerprint using the shared encryption key;
generating, at the server, a score indicative of a degree of correlation between the magnetic fingerprint and a stored value; and
outputting, at the server, the score.

25. The method of claim 24, further comprising receiving the score and determining the authenticity of the data card based on the score.

26. The method of claim 22, further comprising outputting a portion of the recorded data unencrypted.

27. The method of claim 22, further comprising storing at least one encryption key.

28. The method of claim 22, further comprising:
storing at least one reference magnetic fingerprint; and
determining an authenticity of the data card based on a degree of correlation between the magnetic fingerprint and one of the at least one stored reference magnetic fingerprint.

29. The method of claim 22, further comprising enclosing, at least partially, the read head with a security enclosure.

30. The method of claim 29, further comprising:
detecting a breach of the security enclosure; and
performing, in response to the detection of the breach, any of deleting an encryption key, erasing a memory coupled to the processor, and disabling the processor.

31. The method of claim 29, wherein the security enclosure is a tamper resistant material.

32. The method of claim 22, further comprising storing a unique read head identifier.

33. The method of claim 22, further comprising engaging in a mutual authentication process with an external device.

34. The method of claim 33, wherein the external device is any of a point of sale terminal and a remote server.

35. The method of claim 33, wherein the engaging in a mutual authentication process with an external device comprises:

providing read head authenticating information to the external device;

authenticating the read head based on the read head authenticating information;

providing external device authenticating information to the read head; and authenticating the external device based on the external device authenticating information.

36. The method of claim 22, further comprising enabling remote encryption key loading.

* * * * *